H. W. OSTER.
DIE STOCK.
APPLICATION FILED JUNE 17, 1912.
1,085,935.
Patented Feb. 3, 1914.
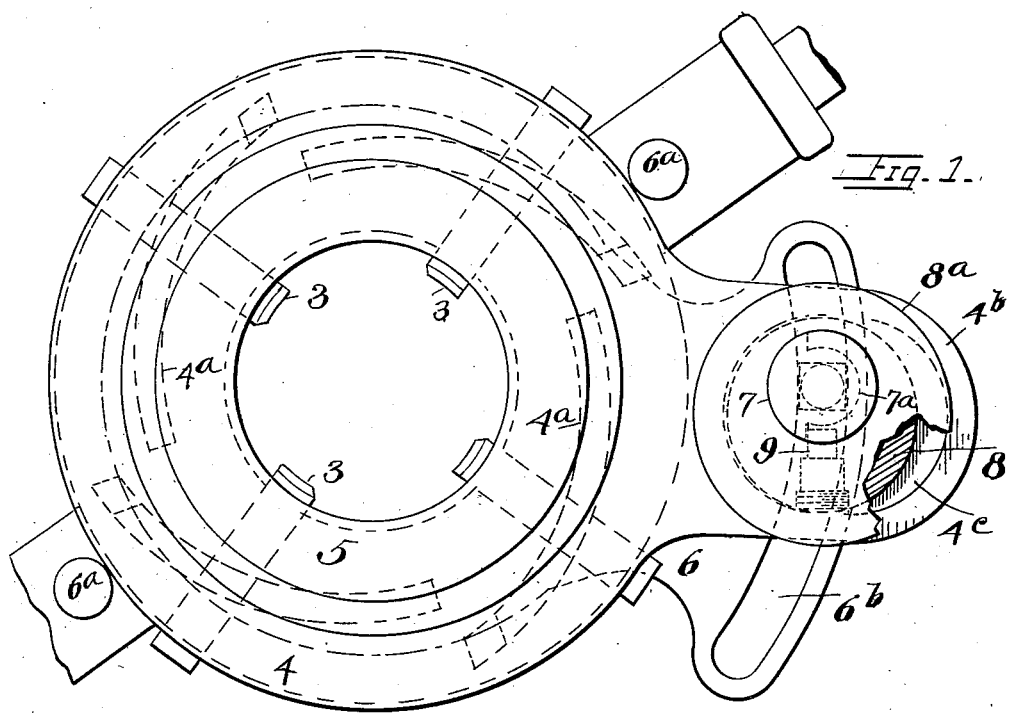
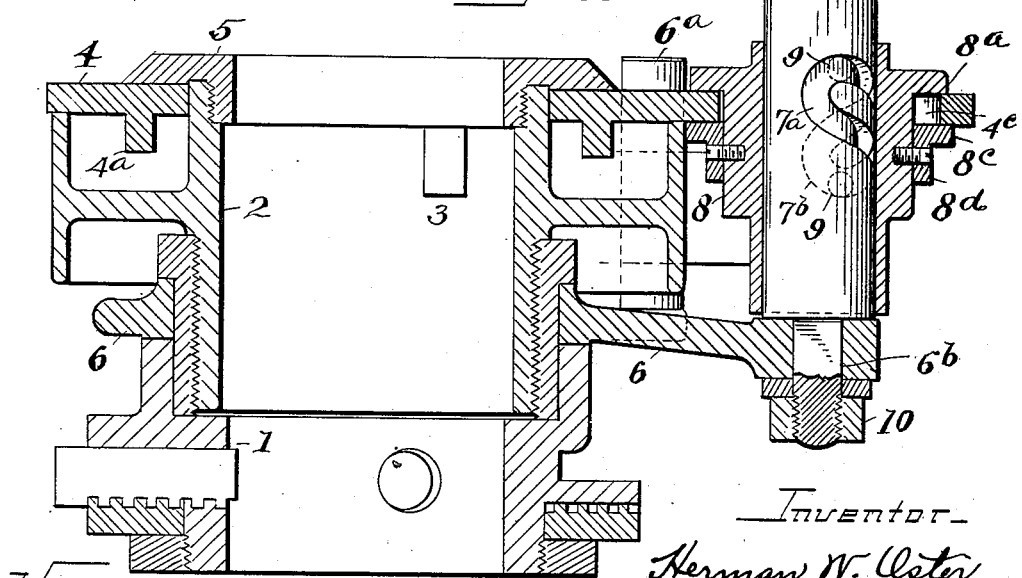

UNITED STATES PATENT OFFICE.

HERMAN W. OSTER, OF CLEVELAND, OHIO, ASSIGNOR TO THE OSTER MANUFACTURING COMPANY, OF CLEVELAND, OHIO, A CORPORATION OF OHIO.

DIE-STOCK.

1,085,935.

Specification of Letters Patent.

Patented Feb. 3, 1914.

Application filed June 17, 1912. Serial No. 703,992.

*To all whom it may concern:*

Be it known that I, HERMAN W. OSTER, a citizen of the United States, residing at Cleveland, in the county of Cuyahoga and State of Ohio, have invented a certain new and useful Improvement in Die-Stocks, of which the following is a full, clear, and exact description.

This improvement in die stocks has for its object to provide an efficient practical die stock which may be adjusted to cut threads on work of different diameters, and which is also adapted to cut what is known as tapered threads.

The invention has for its primary novel feature of construction an eccentric which engages with a lateral extension of the cam plate which controls the position of the dies, in combination with means whereby the longitudinal movement of the die carrier relative to the work holder as the thread is being cut will cause said eccentric to be turned in that direction which will result in a movement of the cam plate adjuster in the die receiving direction.

The invention consists also in some subordinate characteristics of construction which increase the efficiency and practicability of the device, as will be hereinafter described and pointed out with definiteness in the claims.

In the drawing, Figure 1 is a front end view of a die stock embodying the invention, and Fig. 2 is a central longitudinal sectional view thereof.

The work holder 1 is of familiar construction, being a built up member of tubular form, so that the pipe or other cylindrical piece of work to be threaded may pass through it; and being provided with radially movable clamping pins, and carrying a cam plate which engages with said pins so that they may all be moved simultaneously in the clamping or releasing direction. The work holder may, of course, have any other means by which it may be clamped upon the work.

The die carrier 2 is likewise tubular, and is capable of moving rotatably and longitudinally relative to the work holder. In the construction shown the die carrier has its rear end externally threaded so that it may be screwed into the internally threaded work holder; wherefore, as the die carrier is turned relatively to the work holder it will move longitudinally relative thereto at such a rate as is determined by the pitch of the engaging threads upon these two parts. Radially movable dies or chasers 3 are mounted upon this die carrier in the usual way.

4 represents a cam plate which is rotatably mounted upon the die carrier, and has cam scrolls $4^a$ for engaging with the dies, whereby, through the turning of the cam plate, the dies are simultaneously moved outward or inward, as the case may be. This cam plate is held in place by the cap plate 5 which screws into the end of the die carrier, this being a common construction.

6 represents a ring which is rotatably mounted upon the work holder in an annular groove which prevents it from moving longitudinally relative to the work holder. Pins $6^a$ which are parallel with the axis of the die carrier are fixed to this ring, and pass forward through holes in the die carrier, wherefore as the die carrier is turned relative to the work holder, this ring must turn in unison.

7 represents a cylindrical post which is adjustably fixed in an arcual slot $6^b$ in the ring 6. The foot of the post which passes through said slot is so shaped that it cannot turn in the slot. The nut 10 which screws into the threaded rear end of this post serves for clamping the post to the ring when the post has been adjusted to the required position in the arcual slot. This post occupies a position which is parallel with the axis of the tool.

8 represents an eccentric which is rotatably mounted upon the post 7. This eccentric lies in an ablong slot $4^c$ in a lateral projecting arm $4^b$ on the cam plate adjuster 4. By turning this eccentric upon the post, it is obvious that the cam plate must be turned in one direction or the other upon the die carrier, with the result of moving the dies inward or outward, as the case may be. A flange $8^a$ which is rigid with the eccentric engages the front face of the arm $4^b$, and a flange $8^c$, of a collar $8^d$, which is fixed to the eccentric behind the cam plate 4, engages the rear face of this arm and thereby causes the eccentric to share with the die carrier the longitudinal movement thereof relative to the work holder,—said eccentric moving lengthwise upon the post 7.

In the surface of post 7 is an inclined or spiral slot 7ª into which projects a pin 9 which is carried by the eccentric. It will be apparent that since the post cannot turn upon its axis, the eccentric, as it moves rearward upon post 7, will be turned, because of the engagement of this pin in the spiral groove 7ª, and this turning movement will be in that direction which causes the cam plate adjuster 4 to move in the die receding direction.

In the particular construction shown the spiral groove 7ª is associated with a substantially parallel spiral groove 7ᵇ; and these two grooves are connected at their front and rear ends substantially as shown. Because of these two connected grooves, when a thread has been cut and the pin 9 is in the rear end of the groove 7ª, it can be slightly moved so as to pass into the rear end of the groove 7ᵇ so that when the die carrier is unscrewed from the work holder the pin 9 will travel forward in groove 7ᵇ, and the dies will be held out of contact with the work. When the pin 9 has reached the front end of the groove 7ᵇ it may be moved over into the groove 7ª, at which time the cam plate adjuster will have moved to that position which it must be in when the dies are properly placed for beginning a thread cutting operation.

Having described my invention, I claim:

1. In a die stock in combination with a tubular work holder, a tubular die carrier which is movable rotatably and longitudinally with respect to the work holder, dies movably mounted upon said die carrier, and a cam plate adjuster which is rotatably mounted upon the die carrier and engages the dies and has a laterally extended arm through which is an opening, with a ring which is rotatably mounted upon the work holder but is held against longitudinal movement thereon, means compelling said ring to rotate with the die carrier, a cylindrical post fixed to said ring and extending forward therefrom in a direction parallel with the axis of the tube, an eccentric rotatably mounted upon said post and lying within said opening in the lateral extension of the cam plate adjuster, said post and eccentric being provided respectively with a spiral guide and a part for engagement therewith whereby the longitudinal movement of the eccentric on the post will cause the former to turn.

2. In a die stock in combination with a tubular work holder, a tubular die carrier which is movable rotatably and longitudinally with respect to the work holder, dies movably mounted upon said die carrier, and a cam plate adjuster which is rotatably mounted upon the die carrier and engages the dies and has a laterally extended arm through which is an opening, with a ring which is rotatably mounted upon the work holder but is held against longitudinal movement thereon, means compelling said ring to rotate with the die carrier, a cylindrical post fixed to said ring and extending forward therefrom in a direction parallel with the axis of the tube, an eccentric rotatably mounted upon said post and lying within said opening in the lateral extension of the cam plate adjuster, said eccentric being provided with two flanges which engage respectively the front and rear faces of the lateral extension of a cam plate adjuster, said post and eccentric being provided respectively with a spiral guide and a part for engagement therewith whereby the longitudinal movement of the eccentric on the post will cause the former to turn.

3. In a die stock in combination with a tubular work holder, a tubular die carrier which is movable rotatably and longitudinally with respect to the work holder, dies movably mounted upon said die carrier, and a cam plate adjuster which is rotatably mounted upon the die carrier and engages the dies and has a laterally extended arm through which is an opening, with a ring which is rotatably mounted upon the work holder but is held against longitudinal movement thereon, means compelling said ring to rotate with the die carrier, a cylindrical post fixed to said ring and extending forward therefrom in a direction parallel with the axis of the tube, an eccentric rotatably mounted upon said post and lying within said opening in the lateral extension of the cam plate adjuster, said post being provided with an inclined groove, and there being a pin carried by the eccentric and projecting into said groove.

4. In a die stock in combination with a tubular work holder, a tubular die carrier which is movable rotatably and longitudinally with respect to the work holder, dies movably mounted upon said die carrier, and a cam plate adjuster which is rotatably mounted upon the die carrier and engages the dies and has a laterally extended arm through which is an opening, with a ring which is rotatably mounted upon the work holder but is held against longitudinal movement thereon, means compelling said ring to rotate with the die carrier, a cylindrical post fixed to said ring and extending forward therefrom in a direction parallel with the axis of the tube, an eccentric rotatably mounted upon said post and lying within said opening in the lateral extension of the cam plate adjuster, said post being provided with two substantially parallel spiral grooves which are merged together at their front and rear ends, and a pin carried by the eccentric and adapted to move in either of said grooves.

In testimony whereof, I hereunto affix my signature in the presence of two witnesses.

HERMAN W. OSTER.

Witnesses:
E. L. THURSTON,
A. J. HUDSON.

Copies of this patent may be obtained for five cents each, by addressing the "Commissioner of Patents, Washington, D. C."